Figure 1:
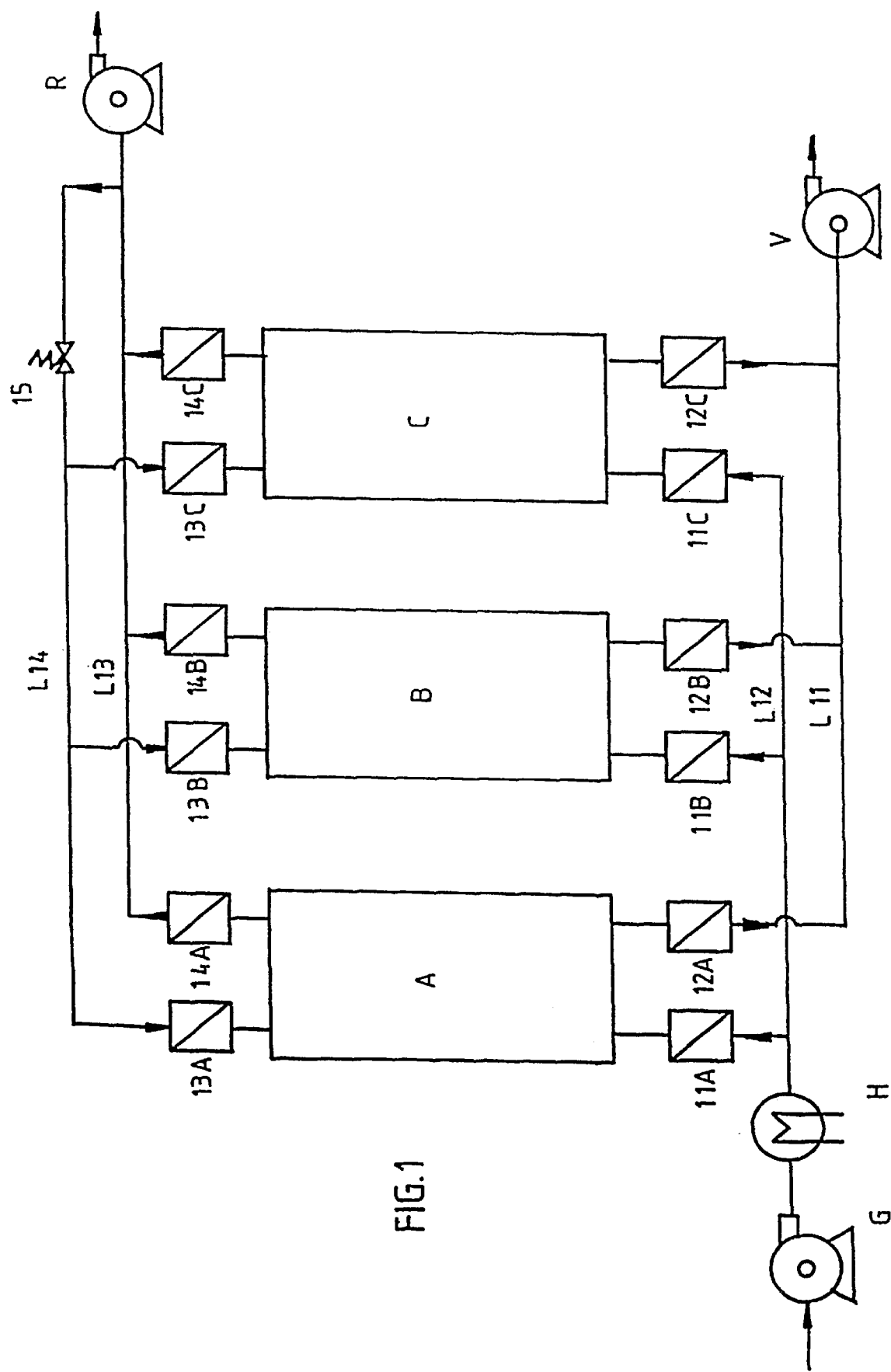

United States Patent [19]

Reiss et al.

[11] Patent Number: 6,004,378
[45] Date of Patent: Dec. 21, 1999

[54] OXYGEN ENRICHMENT PROCESS

[75] Inventors: Gerhard Reiss, Leverkusen; Lothar Puppe, Burscheid, both of Germany

[73] Assignee: Bayer Aktiengesellschaft, Leverkusen, Germany

[21] Appl. No.: 07/840,357

[22] Filed: Feb. 24, 1992

[30] Foreign Application Priority Data

Mar. 1, 1991 [DE] Germany .............................. 41 06 547

[51] Int. Cl.[6] ................................................. B01D 53/047
[52] U.S. Cl. ................................. 95/99; 95/101; 95/102; 95/105; 95/106; 95/122; 95/130; 95/139; 95/288
[58] Field of Search .................................. 55/25, 26, 28, 55/33, 58, 62, 68, 75; 95/96–106, 130, 139, 117–122, 288

[56] References Cited

U.S. PATENT DOCUMENTS

| | | | |
|---|---|---|---|
| 3,140,931 | 7/1964 | McRobbie | 55/25 |
| 3,140,932 | 7/1964 | McKee | 55/68 |
| 3,140,933 | 7/1964 | McKee | 55/68 |
| 3,280,536 | 10/1966 | Berlin | 55/58 |
| 3,313,091 | 4/1967 | Berlin | 55/58 |
| 3,636,679 | 1/1972 | Batta | 55/62 X |
| 3,738,087 | 6/1973 | McCombs | 55/58 |
| 3,773,690 | 11/1973 | Heinze et al. | 252/451 X |
| 4,472,177 | 9/1984 | Sircar | 55/58 X |
| 4,614,525 | 9/1986 | Reiss | 55/58 X |
| 4,684,377 | 8/1987 | Haruna et al. | 55/58 X |
| 4,756,723 | 7/1988 | Sircar | 55/58 X |
| 4,917,710 | 4/1990 | Haruna et al. | 55/58 X |
| 4,950,312 | 8/1990 | Puppe et al. | 55/68 |
| 5,114,440 | 5/1992 | Reiss | 55/58 X |

FOREIGN PATENT DOCUMENTS

| | | |
|---|---|---|
| 1280225 | 10/1968 | Germany . |
| 2016838 | 10/1971 | Germany . |
| 3718673 | 12/1988 | Germany . |

OTHER PUBLICATIONS

H.G.Karge, J.Weitkamp, Zeolites as Catalysts, Sorbents and Detergent Builders, 1989 Elsvier Science Publishers B.V., Amsterdam, "Oxygen Enrichment Of Air With Molecular Sieve Zeolites Using The PSA/VSA Technique".
Patent Abstracts of Japan, vol. 10, No. 120, May 1986 (C–343) (2177).
Patent Abstracts of Japan, vol. 3, No. 109 (C–58) 12 Sep. 1979.

*Primary Examiner*—Robert Spitzer
*Attorney, Agent, or Firm*—Sprung Kramer Schaefer & Briscoe

[57] ABSTRACT

In an adsorptive alternating pressure process for the enrichment of air with oxygen using a molecular sieve zeolite in an adsorber, wherein adsorbed components are desorbed under a pressure below the pressure at which air separation and $N_2$ adsorption is effected and, after desorption, the molecular sieve adsorber is at least partly returned to the air separation pressure with oxygen gas produced in countercurrent to the air separation gas flow, the improvement which comprises cooling product gas and covering the molecular sieve adsorber with the cooled product gas.

5 Claims, 2 Drawing Sheets

OXYGEN ENRICHMENT PROCESS

This invention relates to a process for the enrichment of air with oxygen in an adsorptive alternating-pressure process using molecular sieves zeolites, in which the adsorbed phase is desorbed at a pressure below the air separation and $N_2$ adsorption pressure and, after desorption, the molecular sieve adsorber is partly or completely repressurized to the air separation pressure with produced oxygen gas in countercurrent to the air separation gas flow.

The recovery of oxygen from air is mostly carried out by distillation or rectification of the liquefied air at low temperatures in low-temperature separation plants. These plants are complicated in their design features so that, for some 20 years now, the adsorptive separation of air into oxygen and nitrogen has been carried out to an increasing extent with molecular sieve zeolites or active carbon molecular sieves. VSA/PSA alternating pressure processes are used for the production of oxygen with molecular sieve zeolites, differing from one another mainly in the pressure ranges in which they are carried out (Zeolites as Catalysts, Sorbents and Detergent Builders, Elsevier, Vol. 46, 1989, pages 607–614).

One feature common to all these processes is that air is passed through an MS zeolite adsorber at an adsorption pressure of 1 bar (VSA) or 3–4 bar (PSA) and at a temperature around room temperature (10–40° C.), $H_2O$, $CO_2$ and $N_2$ are adsorbed from the air and $O_2$-rich gas leaves the adsorber. The adsorbed components are always desorbed under a pressure below the adsorption pressure, for example under a pressure of 1 atm, with purging of the adsorber with oxygen produced (PSA) or under reduced pressure by evacuation with or without this purge (VSA).

There are also processes in which the air is precooled to −30 to −60° C. before the adsorbers to increase their adsorption capacity for nitrogen and to increase the selectivity of the adsorption of nitrogen over oxygen (DE-A 1 280 225). In these processes, the air to be separated is precooled by an external process cooler and cooling energy is additionally recovered by heat exchange of the cold oxygen produced and the cold nitrogen desorbed. The outlay on equipment is considerable, i.e. the capital investment involved in plants of the type in question is so high that no advantages are obtained over low-temperature separation plants or conventional VSA/PSA processes.

The function of adsorptive separation processes based on VSA/PSA processes is always to keep the yield, i.e. the ratio of product to untreated gas stream, as high as possible, because high yields means low energy consumption.

One of the problems of precooling the air lies in the separation of moisture. If precooling takes place before the adsorbers, moisture has to be frozen out which is complicated in terms of equipment and considerably increases the investment costs. Separation of the air may also be carried out in two adsorbers arranged in tandem, i.e. first drying and then nitrogen removal.

Cooling of the air, optionally with cold storage systems, could then be carried out between the two adsorbers. However, this again has the disadvantage of considerable outlay on equipment, each nitrogen-separating adsorber requiring a cooling unit. In addition, the dead volume of the adsorbers, i.e. the volume which is not effectively involved in separation, is thus increased, so that the yield for the production of oxygen is reduced.

The problem addressed by the present invention was to provide a process which would not have the disadvantages described above.

A surprising solution has now been found for all VSA/PSA air separation processes, in which the adsorber is returned to adsorption pressure with product, i.e. $O_2$-rich gas, after the $N_2$ desorption step. In this process, the $O_2$ stream produced is partly used to return the adsorber to a relatively high pressure in countercurrent to the adsorption direction (=air flow direction during air separation).

Accordingly, the present invention relates to a process for the enrichment of air with oxygen in an adsorptive alternating pressure process using molecular sieve zeolites, in which the adsorbed phase is desorbed under a pressure below the air separation and $N_2$ adsorption pressure and, after desorption, the molecular sieve adsorber is completely or partly returned to the air separation pressure separation gas flow, in countercurrent to the air with oxygen gas produced characterized in that product gas is cooled in a cooling unit and is used to repressurize the molecular sieve adsorber.

In the process according to the invention, therefore, the filling gas stream or a part of this gas is cooled, the energy required for this purpose being considerably lower than expected.

Molecular sieve zeolites of the A or X and Y type are preferably used in the process according to the invention. The process according to the invention may be carried out particularly economically if the adsorbed components are desorbed under reduced pressure.

However, the process according to the invention may be carried out with equal advantage in such a way that the components are desorbed under a pressure above 1 bar (abs) and the air is separated at a pressure above 1 bar (abs).

Particularly good results are obtained when cooling or the filling gas is gauged in such a way that the average lowest temperature of the molecular sieve adsorber is 0 to −60° C.

Figure 2:
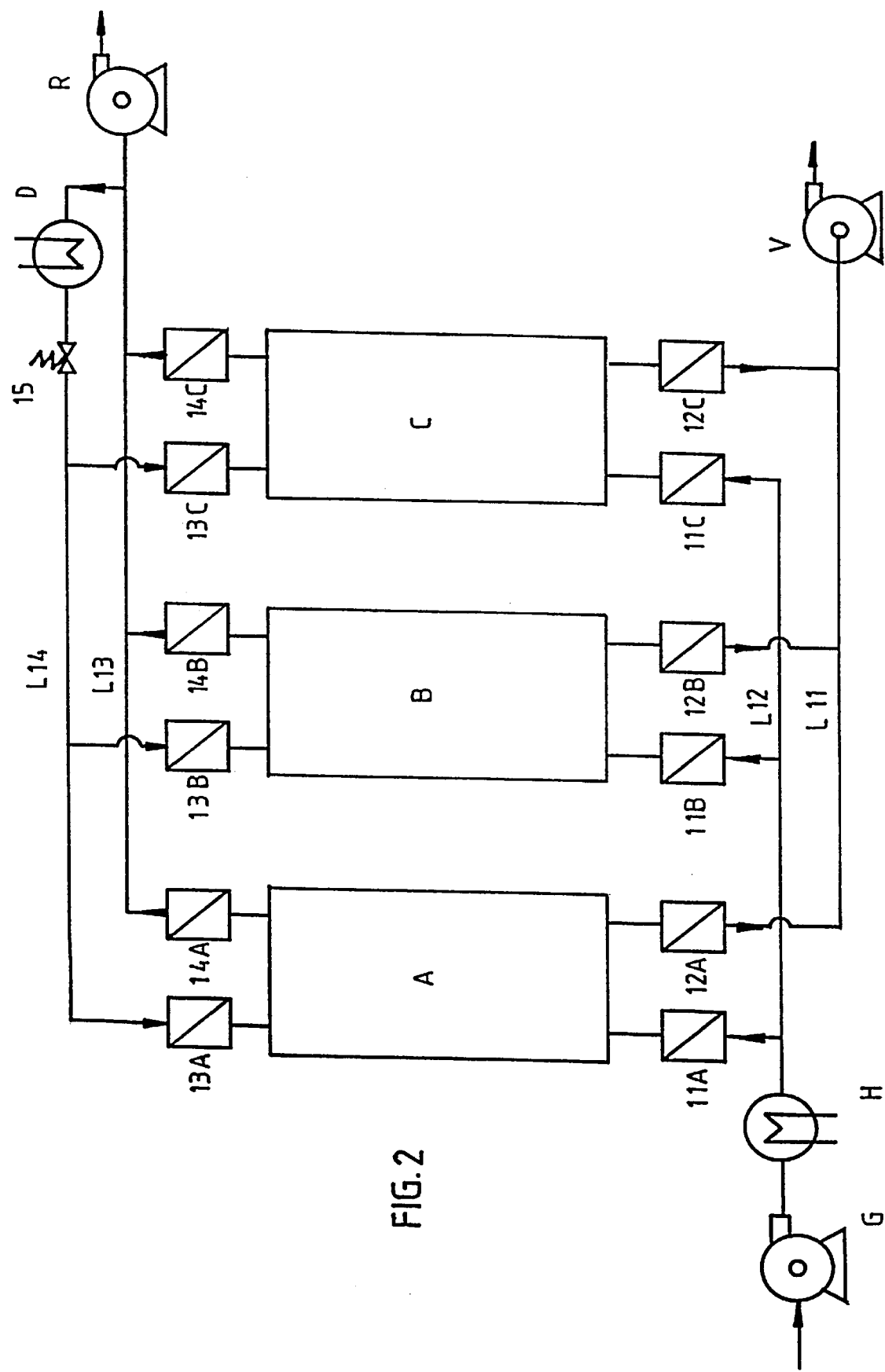

The invention will be further described with reference to the drawings wherein:

FIG. 1 is a schematic flow sheet of a conventional apparatus for separating oxygen from air; and FIG. 2 is a modification of the apparatus of FIG. 1 in accordance with the present invention.

The following examples are intended to illustrate the process according to the invention without limiting it in any way.

The tests were carried out in a VSA plant of the type illustrated in FIG. 1. The dimensions of the adsorbers were 550 mm (diameter) and 2,500 mm (height). A layer of silica gel (70 liters per adsorber) was always present at the bottom of the adsorbers.

Since the process according to the invention is independent of special VSA/PSA modifications, a standard process for the enrichment of air with oxygen was selected.

Ambient air was compressed by a blower G to 1.05 bar (abs), heated to +30° C. in the heater H and introduced through pipe L 12 into the adsorbers A/B/C. $O_2$-rich product was removed from pipe L 13 via valve 14 (A/B/C) and the quantity of product was released into the environment via the blower R. The adsorbers were always evacuated to 200 mbar by a vacuum pump unit V via the pipe L 11, the output or rather the rotational speed of the pump unit being adjustable through a frequency changer. The adsorbers were filled with $O_2$ product to 1.05 bar (abs) through the valve 15 and the pipe L 14. Each process step took 60 seconds.

The adsorber walls, the valves 13/14, the valve 15, the pipes L 13 and L 14 were provided with an approximately 6 to 8 cm thick layer of thermal insulation.

The MS zeolites used were in the form of spherical granules having a particle size distribution of 1.5 to 2.5 mm, an apparent density of approx. 660 to 680 g/l and an $H_2O$ content, as measured in accordance with DIN 8948 ($P_2O_5$ method), of less than 0.5% by weight.

The energy consumption of the vacuum pump unit was directly measured, the losses by the frequency changer being equalized. In industrial-scale plants, there is no need for the frequency changer for above purpose because, in this case, the quantity of MS zeolite is calculated for a predetermined pump size and quantity of $O_2$ product.

Two different zeolites were used for the tests: A=Ca zeolite A; B=Na Zeolite X.

Sample A was prepared in accordance with DE-A 37 18 673 with a calcium content of the zeolite A corresponding to 0.72 $CaO/Al_2O_3$.

Sample B was prepared in accordance with DE-A 20 16 838, composition corresponding to Example 2, the $SiO_2:Al_2O_3$ ratio of the zeolite X powder used for this purpose being 2.4.

To achieve a desired residual water content of the granules of less than 0.5% by weight $H_2O$, the granules were activated with dry ($H_2O$ dew point $-60°$ C.) nitrogen at 450 to 500° C.

EXAMPLES

Example 1 is a known standard process and is used for comparison with the process according to the invention.

Example 1

FIG. 1

Cycle time 0–60 seconds

Air at 30° C. flows through valve 11 A to adsorber A, $O_2$ product is removed through valve 14 A, pipe L 13 and blower R. Valves 13 A and 12 A are closed. Adsorber B is evacuated from approx. 1 bar (abs) to 0.2 bar (abs) through valve 12 B, pump V. Valves 13 B and 11 B are closed. Adsorber C is filled from 0.2 bar to 1.0 bar (abs) with $O_2$ product through valve 15 and valve 13 C. Valves 14 C, 11 C and 12 C are closed.

Cycle time 60–120 seconds

Analogous to the cycle time of 0 to 60 seconds, i.e. adsorber A is evacuated, adsorber B is filled and adsorber C produces oxygen.

Cycle time 120–180 seconds i.e. adsorber A is filled, adsorber B produces oxygen, adsorber C is evacuated.

Example 1A

Molecular sieve zeolite granules according to sample A were used in a quantity of 355 kg per adsorber. For a product quantity of 21.04 $Nm^3/h$, the concentration of $O_2$ in the product was 93% by volume. The vacuum pump had an evacuation capacity at 400 mbar of 506.66 $m^3/h$ (25° C.) for an average power consumption of 9.603 KW, i.e. the specific energy consumption amounted to 0.4907 $KWh/Nm^3$ $O_2$.

Example 1B

Molecular sieve zeolite granules according to sample B were used in a quantity of 365 kg per adsorber. For a product quantity of 16.81 $Nm^3/h$, the concentration of $O_2$ in the product was 93%. The vacuum pump had an evacuation capacity at 0.4 bar of 436.6 $m^3/h$ (25° C.) and a current consumption of 7.99 KW, corresponding to 0.5108 $KWh/Nm^3$ $O_2$.

The test arrangement of the process according to the invention is shown in FIG. 2. A cooling unit D was installed in pipe L 14 between $O_2$ blower R and valve 15 to cool the quantity of $O_2$ flowing into the evacuated adsorber through pipe L 14. In the tests, the cooling unit was adjusted as far as possible to the same output for the same quantity of $O_2$ product, so that the average MS zeolite temperature fell to below $-10°$ C. A commercially obtainable Freon refrigeration unit was used.

The energy required for cooling may also be obtained from other sources, for example from a cooling brine or, if a so-called back-up system is present, from the evaporation of the liquid oxygen. Since the issuing product gas is still cold, the "cooling energy" of the product gas may also be at least partly recovered via a heat exchanger. However, this recovery is not necessary if the product gas stream has to be further compressed, for example to 5–20 bar, so that a smaller compressor may be used at low intake temperatures.

Example 2

The process according to the invention is carried out in exactly the same way as in Example 1, the change lying in the above-mentioned cooling of the filling gas stream.

Example 2A

Molecular sieve zeolite sample A was used in a quantity of 355 kg per adsorber. For a concentration of oxygen of 93% in the product stream, the quantity of product amounted to 21.02 $Nm^3/h$. The vacuum pump had an evacuation capacity at 0.4 bar of 684.45 $m^3/h$ (+25° C.) and a power consumption of 13.42 KW. The cooler D had a consumption of 320 watts, so that the total power consumption of pump and cooler amounted to 0.702 $KWh/Nm^3$ $O_2$. Accordingly, an improvement over the standard process of Example 1A was not achieved with sample A.

Example 2B

Molecular sieve zeolite sample B was used in a quantity of 365 kg per adsorber. For an $O_2$ concentration of 93%, the quantity of product amounted to 33.65 $Nm^3/h$. The vacuum pump V had an evacuation capacity at 400 mbar of 737.8 $m^3/h$ (25° C.). The average energy consumption of this pump was 14.46 KW. At the same time, an energy consumption of 0.5 KW was adjusted for the cooler D. The specific energy consumption of cooler and vacuum pump was therefore 0.478 $KWh/Nm^3$ $O_2$.

The test of Example 2B achieved the lowest specific energy consumption and by far the largest quantity of $O_2$ product, based on the quantity of MS zeolite used. Accordingly, a process having very low energy consumption values and very low investment costs was obtained by cooling of the filling gas stream and by optimizing and adapting the quality of the MS zeolites.

It will be understood that the specification and examples are illustrative but not limitative of the present invention and that other embodiments within the spirit and scope of the invention will suggest themselves to those skilled in the art.

We claim:

1. An adsorptive alternating pressure process for the enrichment of an air feed gas with oxygen using a molecular sieve zeolite in an adsorber wherein adsorbed components are desorbed under a pressure below the pressure at which air separation and $N_2$ adsorption is effected and, after desorption, the molecular sieve adsorber is at least partly or completely repressurized to the air separation pressure with the oxygen-enriched gas in countercurrent to the air feed gas flow wherein all or part of the oxygen-enriched gas is cooled prior to repressurizing the molecular sieve with the proviso that the air feed gas is not cooled prior to contact with the molecular sieve.

2. A process according to claim 1, wherein the molecular sieve zeolite is of type A or X and Y.

3. A process according to claim 1, wherein the adsorbed components are desorbed under reduced pressure below 1 atmosphere.

4. A process according to claim 1, wherein desorption of the adsorbed components takes place at about 1 bar (abs) while separation of the air takes place at a pressure above 1 bar (abs).

5. A process according to claim 1, wherein cooling of the product gas employed for filling is carried out to an extent that the average lowest temperature of the molecular sieve adsorber is 0 to −60° C.

\* \* \* \* \*